(12) United States Patent
Asperger et al.

(10) Patent No.: US 8,577,031 B2
(45) Date of Patent: Nov. 5, 2013

(54) ARRANGEMENT COMPRISING AN INTEGRATED CIRCUIT

(75) Inventors: Karl Asperger, Vienna (AT); Jochen Kiemes, Stuttgart (DE); Roland Lange, Brigachtal (DE); Andreas Lindinger, Flözlingen (DE); Gerhard Rombach, Triberg (DE)

(73) Assignee: Continental Automotive GmbH, Hannover (DE)

( * ) Notice: Subject to any disclaimer, the term of this patent is extended or adjusted under 35 U.S.C. 154(b) by 1517 days.

(21) Appl. No.: 10/599,230

(22) PCT Filed: Mar. 10, 2005

(86) PCT No.: PCT/EP2005/051072
§ 371 (c)(1),
(2), (4) Date: Sep. 22, 2006

(87) PCT Pub. No.: WO2005/098567
PCT Pub. Date: Oct. 20, 2005

(65) Prior Publication Data
US 2008/0219441 A1 Sep. 11, 2008

(30) Foreign Application Priority Data
Mar. 24, 2004 (DE) .......................... 10 2004 014 435

(51) Int. Cl.
*G06F 21/00* (2013.01)
(52) U.S. Cl.
USPC . 380/46; 380/4; 380/42; 380/52; 365/185.04; 365/185.22; 257/679; 257/922

(58) Field of Classification Search
USPC .......... 380/46; 326/8; 257/315, 679, 922, 681
See application file for complete search history.

(56) References Cited

U.S. PATENT DOCUMENTS

| | | | |
|---|---|---|---|
| 4,811,288 A | 3/1989 | Kleijne et al. | 365/52 |
| 4,860,351 A * | 8/1989 | Weingart | 713/194 |
| 5,343,616 A | 9/1994 | Roberts | |
| 5,473,692 A | 12/1995 | Davis | 380/25 |
| 5,533,123 A | 7/1996 | Force et al. | 380/4 |
| 5,824,571 A * | 10/1998 | Rollender et al. | 438/130 |
| 5,828,753 A | 10/1998 | Davis | |
| 5,861,662 A * | 1/1999 | Candelore | 257/679 |

(Continued)

FOREIGN PATENT DOCUMENTS

| | | |
|---|---|---|
| CN | 1433576 | 7/2003 |
| DE | 19512266 | 3/1996 |

(Continued)

OTHER PUBLICATIONS

International Search Report, PCT/EP2005/051072, 8 pages, Mailing Date Aug. 18, 2005.

(Continued)

*Primary Examiner* — Taghi Arani
*Assistant Examiner* — Jason Lee
(74) *Attorney, Agent, or Firm* — King & Spalding L.L.P.

(57) ABSTRACT

An integrated circuit (1) is provided with function modules (2) which comprise a central processing unit (4) for treating data and executing a program and a cache memory (5). Until now, it was complicated and costly to ensure the manipulation security of the modules. The function modules (2) comprise an encoding unit (6) for data encoding and decoding.

17 Claims, 1 Drawing Sheet

(56) References Cited

U.S. PATENT DOCUMENTS

| | | | |
|---|---|---|---|
| 5,943,421 A | 8/1999 | Grabon | 380/4 |
| 6,198,250 B1 | 3/2001 | Gartstein et al. | |
| 6,233,339 B1* | 5/2001 | Kawano et al. | 380/44 |
| 6,330,668 B1 | 12/2001 | Curiger et al. | 713/1 |
| 6,355,316 B1 | 3/2002 | Miller et al. | 428/13 |
| 6,496,119 B1 | 12/2002 | Outterstedt et al. | 340/653 |
| 6,523,118 B1 | 2/2003 | Buer | 713/189 |
| 6,711,045 B2* | 3/2004 | Fricke et al. | 365/63 |
| 7,005,733 B2* | 2/2006 | Kommerling et al. | 257/679 |
| 2001/0015919 A1* | 8/2001 | Kean | 365/200 |
| 2001/0033012 A1* | 10/2001 | Kommerling et al. | 257/679 |
| 2001/0053565 A1* | 12/2001 | Khoury | 438/121 |
| 2002/0040420 A1* | 4/2002 | Yamauchi et al. | 711/118 |
| 2002/0060359 A1 | 5/2002 | Pockrandt | |
| 2003/0084336 A1* | 5/2003 | Anderson et al. | 713/200 |
| 2003/0147267 A1* | 8/2003 | Huttunen | 365/63 |
| 2003/0206388 A9* | 11/2003 | Anthony et al. | 361/118 |
| 2003/0218475 A1 | 11/2003 | Gammel | 326/8 |
| 2003/0229799 A1 | 12/2003 | Kaneko | 713/193 |
| 2004/0106239 A1* | 6/2004 | Nakajima et al. | 438/151 |
| 2004/0212017 A1* | 10/2004 | Mizuno et al. | 257/368 |

FOREIGN PATENT DOCUMENTS

| | | |
|---|---|---|
| DE | 10044837 C1 | 9/2001 |
| EP | 0495645 | 7/1992 |
| EP | 1054316 | 11/2000 |
| GB | 2182176 | 5/1987 |
| RU | 94036200/25 | 7/1996 |
| RU | 95103311/28 | 11/1996 |
| WO | WO 93/16574 A1 | 8/1993 |
| WO | 9600953 | 1/1996 |
| WO | WO 99/52168 A1 | 10/1999 |
| WO | 0028399 | 5/2000 |
| WO | WO 00/58807 A1 | 10/2000 |
| WO | WO 03015169 A1 * | 2/2003 |

OTHER PUBLICATIONS

International Search Report with Written Decision (with english translation), PCT/20051051072, 10 pages, Mar. 24, 2004.

"Novosti Elektrotekhniki" ("Elektronical News"), article "Kak pravilno izmerit soprotivlenie izolyatsil elektroustanovok" ("A correct way of measuring the impedance of isolation in electrical appliances"): [online] No. 1(13) 2002, [found on May 21, 2009]. Found online: <URL: http://news.elteh.ru/arh/2002/13/22.php>.

"Rudkovodstvo po materinskim platam" ("Manual on motherboard") [online] Jul. 5, 2001, [Found on May 21, 2009]. Fond online: <URL: http://www.hardvision.ru/?dr=mb&doc=mb_guide_inside>.

Journal "Komponenti I tekhnologii" (Components and Technologies), article "Istoriya razvitiya i portret kompanii im Electronic Geraete: datchiki" (Background and profile of ifm Electronic Geraete company: sensors). [online] No. 1 2003, [found on May 27, 2009], Found online at: <URL: http://www.kit-e.ru/articles/sensor/2003_01_18.php>.

Russian Office Action, Russian application No. 2006137366, 8 pages, Jun. 2, 2009.

European Search Report for Application No. 05716983.1 (8 pages), May 2, 2010.

* cited by examiner

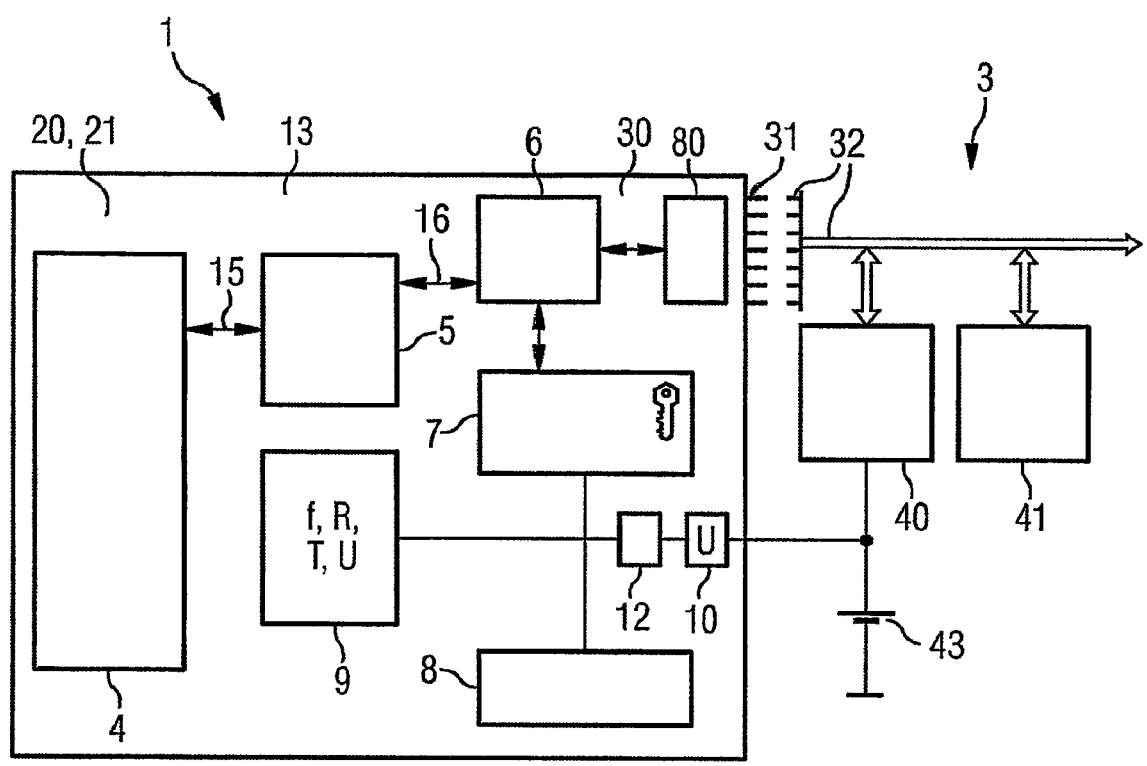

ARRANGEMENT COMPRISING AN INTEGRATED CIRCUIT

CROSS-REFERENCE TO RELATED APPLICATIONS

This application is a U.S. national stage application of International Application No. PCT/EP2005/051072 filed Mar. 10, 2005, which designates the United States of America, and claims priority to German application number DE 10 2004 014 435.4 filed Mar. 24, 2004, the contents of which are hereby incorporated by reference in their entirety.

TECHNICAL FIELD

The invention relates to an arrangement comprising an integrated circuit and to an integrated circuit comprising function modules, wherein the function modules comprise a central processing unit, by means of which data can be processed and programs can be executed, and a cache memory.

BACKGROUND

Arrangements comprising integrated circuits of the type described above are found today in almost all articles of daily use comprising integrated electronics. Devices for electronic data processing, communication or for recording data have provisions which restrict the read, write or modification access to the data depending on the type of data processed. This is intended to protect data against public accessibility or manipulation. It is particularly in the field of the future generation of tachographs, the digital tachograph, that protection of recorded data against manipulation is of the highest significance.

Previous manipulation-protected systems with high security requirements normally consist of a number of discrete assemblies to which different functions are allocated, for example a central processing unit, an encryption unit and various memories are in each case normally an independent unit which is connected to the other units. The requirement of having a number of assemblies and assembling them and matching them to one another is associated with high costs in the series production.

SUMMARY

Using the problems and disadvantages of the prior art as a starting point, the invention is based on the object of creating an arrangement of the type initially mentioned which meets the highest requirements for manipulation protection and, at the same time, exhibits suitability for series production at lower costs.

The object according to the invention is achieved by means of an integrated circuit of the type initially mentioned, which comprises an encryption unit as function module by means of which data or program code can be encrypted and decrypted.

Due to the fact that an encryption unit, as function module of the integrated circuit, is an element of this component, the additional provision, installation and matching to surrounding components can be saved in the production and development of an arrangement comprising an integrated circuit according to the invention. The further great advantage obtained synergetically is that the encryption unit can be separated only with difficulty from the integrated circuit, the component of which it is, and attempts at manipulation are therefore condemned to fail.

The manipulation of an integrated circuit according to the invention, particularly the separation of individual function modules, is particularly difficult if the integrated circuit is constructed as a semiconductor chip, particularly if individual function modules are intermeshed in the manner of a puzzle, in such a way that individual function modules can no longer be recognized discretely. In this connection, particularly complex geometric entanglements can be selected so that the intermixed semiconductor structures can no longer be recognized separately as such by means of an analysis with the intention of manipulation.

Additional protection against manipulation is obtained if the function modules comprise a first memory in which cryptological keys are stored. The integration of such a first memory makes a selective access and selective reading-out of the cryptological key more difficult.

The expenditure for the administration of cryptological keys by the manufacturer of the devices is completely absent, with the additional gain in security if the function modules comprise a random-number generator (RNG) which generates the cryptological keys equally autonomously. These keys can be suitably deposited in the first memory.

As a further function module, a real-time clock can be advantageously incorporated in the integrated circuit, the correct function of which also provides high relevance for protection against manipulation.

So that a manipulation attack is not only impaired but rendered impossible, a security sensor system can be advantageously integrated in the circuit as a function module by means of which at least one operating parameter of the integrated circuit can be monitored. Suitable operating parameters for monitoring are, for example, the clock frequency of the real-time clock, the system or CPU clock, or an operating temperature, or an operating voltage of the integrated circuit, or the state of a protective layer on the integrated circuit, or a combination of the aforementioned operating parameters. If the integrated circuit is constructed as semiconductor component, the monitoring of the state of a protective layer on the integrated circuit is particularly effective since the protective layer must be destroyed in order to access the structure of the semiconductor chip mechanically. In this connection, it is appropriate if the protective layer is constructed as an active protective layer and is applied directly to the die of the semiconductor chip. In a suitable development, it is provided that the active protective layer consists of at least one elongated electrical line which extends along the surface of the die, particularly in mutually parallel tracks section by section. The monitoring can be, for example, a monitoring of the ohmic resistance of the electrical line, wherein a change in the resistance value, which allows a destruction of the electrical line to be inferred, suitably produces a deletion of the data to be protected. The microcontroller is preferably placed into a protective state, for example reset. In this manner, the "integrated circuit" system according to the invention becomes comparatively failsafe.

The monitoring of the operating parameter is suitably handled in such a manner that at least one limit value is predetermined for the operating parameter to be monitored, the operating parameter is measured and compared with the limit value and when the result exceeds or drops below the limit value, the content of the first memory is deleted. The limit value must be suitably selected in such a manner that the specifications for normal operation do not lead to an interruption of the operation of the arrangement, for example data are not yet deleted at a temperature of −40° C. in the automotive field.

The manageability and security of the integrated circuit according to the invention is additionally increased if it is arranged in a package and has terminal contacts brought out of the package. Accordingly, the package would first have to be opened for the purpose of mechanical manipulation.

A greater integration of the circuit according to the invention can be achieved if individual function modules have an essentially planar extent and are arranged adjacently to one another in the direction of the normal to the surface. Thus, for example, the central processing unit can be arranged stacked with various memories or other function modules.

Attacks which draw conclusions regarding the operating state from the behavior of the supply current of the integrated circuit can be advantageously repelled if the function modules comprise an integrated voltage regulator which regulates the operating voltage and in this manner renders this operating parameter comparatively noisy towards the outside.

The integrated circuit according to the invention develops particular advantages in an arrangement having a second memory which is connected to the integrated circuit according to the invention by means of a data bus and in which second memory data or program code are stored encrypted and which has memory cells which in each case have a memory address and each memory cell can be addressed directly in reading or writing manner. To protect the entire arrangement against failure of an external voltage supply, it is appropriate if it is connected to a battery so that the voltage supply is maintained when another power supply is lacking. Thus, it is also possible to save costs if the second memory is constructed cost effectively to be volatile and is buffered by means of the battery.

As replacement for or supplement to the second memory, a third memory may be appropriate which is connected to the integrated circuit by means of a data bus and is not constructed to be volatile, particularly constructed as flash memory or ROM, wherein the data or program code are preferably stored encrypted in the third memory.

The security sensor system is particularly advantageously buffered by means of a battery. As an alternative or supplement to this measure, an auxiliary power source integrated in the package, for example a capacitor, can be provided which provides the power in the case of a registered manipulation attempt for deleting the memories, particularly the first memory.

In the text which follows, the invention is described in greater detail for the purpose of illustration by means of a special exemplary embodiment. Apart from the present exemplary embodiment, the expert will obtain numerous other design possibilities from the invention described here. In particular, combinations of features which result from combinations of the claims are also attributable to the invention even if no expressed correspondingly reference is given.

BRIEF DESCRIPTION OF THE DRAWINGS

FIG. 1 shows a diagrammatic representation of an arrangement according to the invention.

DETAILED DESCRIPTION

FIG. 1 shows an integrated circuit 1 comprising a number of function modules 2, which is connected to external components 3. The integrated circuit has, apart from a central processing unit 4, other function modules 2, namely a cache memory 5, an encryption unit 6, a first memory 7, a real-time clock 8, a random-number generator 80 and a security sensor system 9. In addition, a voltage regulator 10 and an auxiliary power source 12 are integrated components of the integrated circuit 1 constructed as semiconductor chip 13. The central processing unit 4 processes data or executes programs which it reads out of the cache memory 5 by means of a first data bus 15.

The cache memory 5 is connected to the encryption unit 6 by means of a second bus 16. The encryption unit 6 reads the encrypted data or code out of the second or third memory 40, 41 by means of the address data bus 32, decrypts them by means of the cryptographic key 18 stored in the first memory 7 and writes them into the cache or into other internal registers of the central processing unit 4. The cryptographic keys 18 have previously been generated by the random-number generator 80. For generating the cryptographic keys 18 which are stored in the first memory 7, the random-number generator 80 uses, for example, the starting values from the statistical fluctuations (noise) of internal physical measurement quantities such as chip temperature, supply voltage, clock frequency.

Apart from the operating temperature T, the operating voltage U, the clock frequency f, the security sensor system 9 also monitors the ohmic resistance R of a protective layer 20 which consists of essentially parallel tracks of an electrical line 21 which are directly applied to the die of the semiconductor chip 13. The resistance R measured is permanently compared with a limit value and when the limit value is exceeded, the central processing unit 4 initiates the deletion of the first memory 7, the integrated circuit 1 subsequently being brought into a protective state, for example reset.

The integrated circuit 1 is surrounded by a package 30 which has terminal contacts 31 which are at least partially connected to an address data bus 32. The integrated circuit 1 exchanges data with a second memory 40 and a third memory 41 by means of the address data bus 32. The second memory 40 is constructed as volatile RAM and protected against voltage failure by means of a battery 43, as is the integrated circuit 1. The third memory 41 is constructed to be nonvolatile as a flash memory or ROM. The data stored in the second memory 40 and third memory 41 are encrypted by using the cryptological key 18 and are encrypted or decrypted by means of the encryption unit 6 with each access.

What is claimed is:

1. An integrated circuit comprising function modules, wherein the function modules comprise:
   a central processing unit designed to process data and to execute programs,
   a cache memory,
   a random-number generator configured to generate at least one cryptological key, and
   a first memory storing the at least one cryptological key generated by the random-number generator,
   an encryption unit designed to encrypt and decrypt data using the at least one cryptographic key stored in the first memory,
   a security sensor system including a protective layer on the integrated circuit including at least one elongated electrical line extending along the surface of the integrated circuit, the security sensor system operable to:
      monitor an ohmic resistance of at least one electrical line of the protective layer on the integrated circuit,
      compare the monitored ohmic resistance of the at least one electrical line with a resistance limit value,
      detect a breaking of the electrical line based on the comparison, and
      when a breaking of the electrical line is detected, automatically initiate the deletion of data from at least one memory of the integrated circuit; and an integrated voltage regulator that regulates an operating voltage or current of the integrated circuit to render the operating voltage or current noisy, thus preventing attacks based on examination of the current of the integrated circuit.

2. The integrated circuit according to claim 1, wherein function modules comprise a real-time clock.

3. The integrated circuit according to claim 1, wherein operating parameters to be monitored additionally is the clock frequency of the real-time clock and/or an operating temperature at a point in the integrated circuit and/or an operating voltage of the integrated circuit.

4. The integrated circuit according to claim 1, wherein the integrated circuit is arranged in a package and has terminal contacts brought out of the package.

5. The integrated circuit according to claim 1, wherein individual function modules have an essentially planar extent and are arranged adjacently to one another in the area of the normal to the surface.

6. The integrated circuit according to claim 1, wherein the function modules comprise an integrated voltage regulator which regulates an operating voltage.

7. The integrated circuit according to claim 1, wherein it is constructed as semiconductor chip.

8. The integrated circuit according to claim 7, wherein semiconductor structures of the individual function modules are intermeshed in the manner of a puzzle in order to avoid individual function modules from being recognizable.

9. The integrated circuit according to claim 7, wherein an active protective layer which consists of at least one elongated electrical line which extends along the surface of a die of the semiconductor chip, particularly in mutually parallel tracks section by section, is applied directly to the die of the semiconductor chip.

10. An arrangement comprising an integrated circuit as claimed claim 1, wherein the integrated circuit is connected by means of a data bus to a second memory in which data are stored encrypted, wherein the second memory has memory cells which in each case have a memory address and each memory cell can be addressed directly in reading or writing manner.

11. The arrangement according to claim 10, wherein the second memory is volatile and is connected to a battery so that the voltage supply is maintained when another power supply is lacking.

12. The arrangement according to claim 10, wherein the integrated circuit is connected by means of a data bus to a non-volatile third memory in which data or program code are stored encrypted.

13. The arrangement according to claim 10, wherein the security sensor system is connected to a battery so that the voltage supply is maintained if another power supply is lacking.

14. The arrangement according to claim 10, wherein the security sensor system is connected to an auxiliary power source, integrated in the package, which provides the power for deleting the first memory.

15. The arrangement according to claim 12, wherein the third memory is a Flash memory or ROM.

16. An integrated circuit comprising function modules, wherein the function modules comprise:
   a central processing unit designed to process data and to execute programs,
   a cache memory,
   an encryption unit designed to encrypt and decrypt data and the function modules comprise a security sensor system including a protective layer on the integrated circuit including at least one elongated electrical line extending along the surface of the integrated circuit, the security sensor system operable to monitor the state of the protective layer on the integrated circuit such that when a breaking of the electrical line is detected, data is automatically deleted from at least one memory of the integrated circuit,
   a random-number generator and a first memory in which cryptological keys are stored, and wherein cryptological keys which are stored in the first memory are generated by means of the random-number generator, and
   an integrated voltage regulator that regulates an operating voltage or current of the integrated circuit to render the operating voltage or current noisy, thus preventing attacks based on examination of the current of the integrated circuit.

17. An integrated circuit system including:
   an integrated circuit comprising:
      a central processing unit designed to process data and to execute programs,
      a first memory storing a cryptographic key,
      an encryption unit designed to encrypt and decrypt data using the cryptographic key stored in the first memory,
      a security sensor system including a protective encapsulation of the integrated circuit and a monitoring system that monitors the state of the protective encapsulation of the integrated circuit such that when a destroyed state of the protective layer is detected, data is automatically deleted from at least one memory of the integrated circuit, and
      at least one terminal contact extending through the protective encapsulation of the integrated circuit, and
   an external second memory located physically outside the protective encapsulation of the integrated circuit and connected to the integrated circuit via the at least one terminal contact extending through the protective encapsulation of the integrated circuit, and connected to the encryption unit of the integrated circuit via a data bus extending through the at least one terminal contact, the external second memory storing data encrypted with the cryptographic key stored in the first memory,
   wherein the encryption unit is designed to read data or code out of the external second memory, decrypt the data or code using the cryptographic key stored in the first memory, and write the decrypted data or code into the first memory or other memory of the integrated circuit.

* * * * *